United States Patent
Cross et al.

(10) Patent No.: US 10,491,634 B2
(45) Date of Patent: Nov. 26, 2019

(54) SYSTEMS AND METHODS FOR EXECUTING PROCESSOR EXECUTABLE APPLICATIONS

(71) Applicant: NETPP, INC., Sunnyvale, CA (US)

(72) Inventors: John Eliot Cross, Malibu, CA (US); Rishi Sharad Katdare, Pleasanton, CA (US)

(73) Assignee: NETAPP, INC., Sunnyvale, CA (US)

( * ) Notice: Subject to any disclaimer, the term of this patent is extended or adjusted under 35 U.S.C. 154(b) by 330 days.

(21) Appl. No.: 15/588,402

(22) Filed: May 5, 2017

(65) Prior Publication Data
US 2018/0324216 A1 Nov. 8, 2018

(51) Int. Cl.
G06Q 10/10 (2012.01)
H04L 9/32 (2006.01)
H04L 29/08 (2006.01)
H04L 29/06 (2006.01)
G06F 21/10 (2013.01)
G06F 21/12 (2013.01)
G06F 21/62 (2013.01)

(52) U.S. Cl.
CPC ............ *H04L 63/20* (2013.01); *G06F 21/10* (2013.01); *G06F 21/12* (2013.01); *G06F 21/6218* (2013.01); *G06Q 2220/18* (2013.01)

(58) Field of Classification Search
CPC ............ G06F 21/10; G06F 8/71; G06F 21/12; G06Q 2220/18
See application file for complete search history.

(56) References Cited

U.S. PATENT DOCUMENTS

| | | | | |
|---|---|---|---|---|
| 10,289,854 B1* | 5/2019 | Jacobs | ............. | G06F 21/62 |
| 2007/0056019 A1* | 3/2007 | Allen | ............. | G06F 21/6236 726/1 |
| 2009/0106819 A1* | 4/2009 | Li | ............. | G06F 21/10 726/1 |
| 2014/0180970 A1* | 6/2014 | Hettenkofer | ............. | G06N 5/025 706/11 |
| 2015/0269383 A1* | 9/2015 | Lang | ............. | G06F 21/57 726/1 |
| 2016/0092887 A1* | 3/2016 | Jagad | ............. | G06Q 30/018 705/59 |
| 2016/0125172 A1* | 5/2016 | Fuller | ............. | G06F 16/285 726/26 |
| 2018/0026893 A1* | 1/2018 | Jeuk | ............. | H04L 47/20 370/236 |

* cited by examiner

*Primary Examiner* — Daniel B Potratz
*Assistant Examiner* — Vu V Tran
(74) *Attorney, Agent, or Firm* — Klein, O'Neill & Singh, LLP

(57) ABSTRACT

Methods and systems for executing an application by a computing device are provided. One method includes generating an operating policy for a processor executable application based on a licensing term; associating an identifier for storing the operating policy in a data structure external to the application; providing the operating policy to the application using an application programming interface (API) for controlling execution of the application; and executing the application using the operating policy.

20 Claims, 9 Drawing Sheets

SYSTEMS AND METHODS FOR EXECUTING PROCESSOR EXECUTABLE APPLICATIONS

TECHNICAL FIELD

The present disclosure relates to innovative technology for executing processor executable applications at a computing device using operating policies that are stored externally from the applications.

BACKGROUND

Entitlement and enforcement policies can be used to manage software application execution by computing devices. These policies provide different parameters for software execution, e.g. based on a defined term for a software license, performance criteria for the software application (e.g. a latency guarantee or storage capacity guarantee provided by a storage provider), number of users that are allowed to use a software application at any given time or any other parameter. Furthermore, software applications with different policies may be used in different environments, for example, in a subscription model, in the cloud or any other operating environment.

Typically, policies are hardcoded in the application code base. For example, if a software is licensed for twelve months then a policy within the software code is used to control the licensing term. This approach can be cumbersome and tedious, especially, when the same software application is used in multiple environments, with different licensing terms to accommodate the business interest of the software provider. This may require a software provider to maintain multiple versions of the same application to meet different software licensing objectives. The policies may also have to be changed as the operating conditions/licensing terms for the software applications may change over time. This may require updating the software application code whenever there is a policy change. This adds to the overall cost of software development and maintenance and hence is undesirable for the software providers and the customers using the software. Continuous efforts are being made to streamline software development, software execution and maintenance and optimize costs.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

Figure 1A:
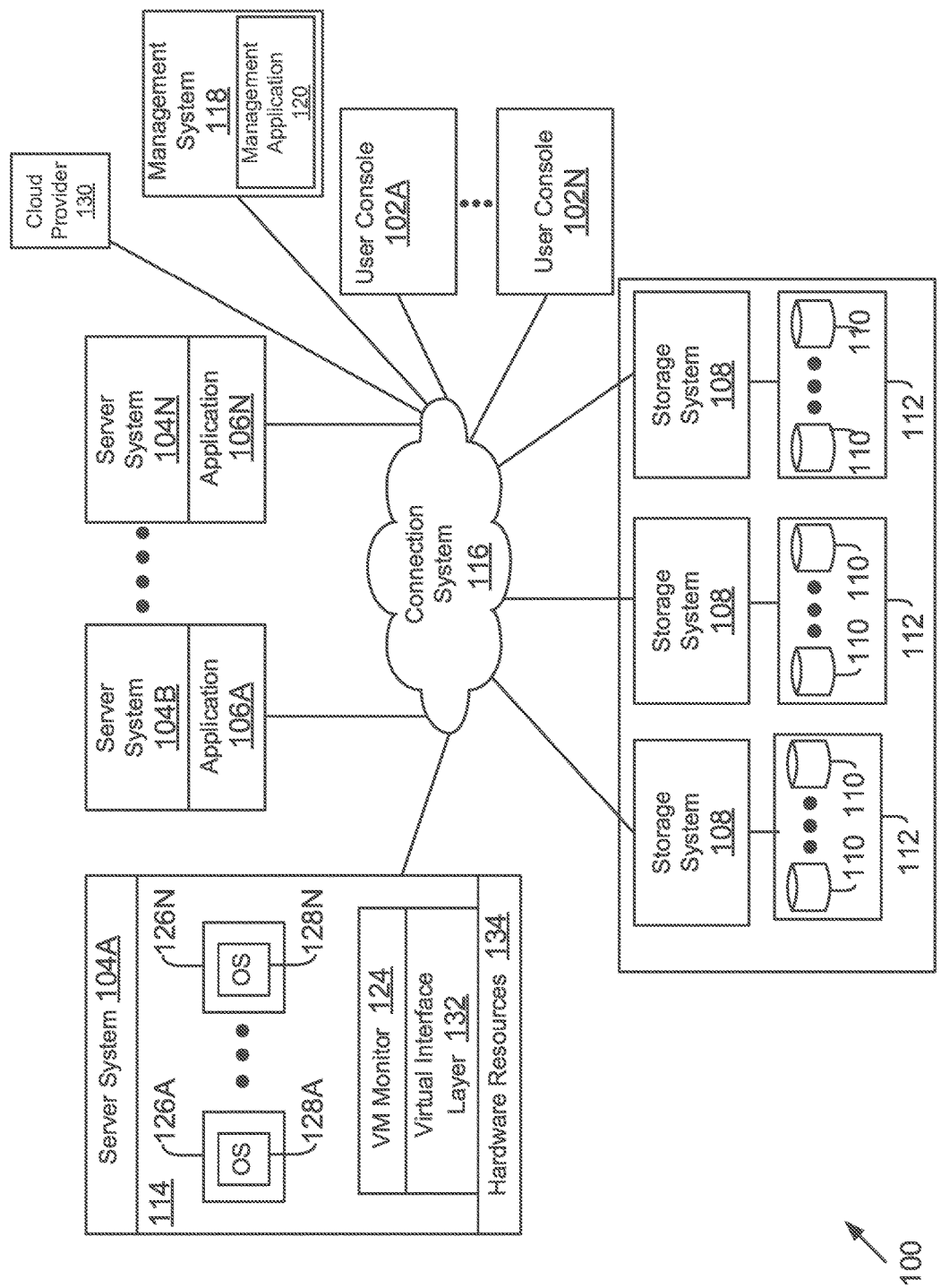
FIG. 1A shows an example of an operating environment for the various aspects disclosed herein.

System 100:

FIG. 1A shows an example of an operating environment 100 (also referred to as system 100), for using the innovative computing technology for software execution, implementing the various adaptive aspects of the present disclosure. In one aspect, system 100 may include a plurality of computing systems 104A-104N (may also be referred to as server 104 or as host system 104) that may access one or more storage systems 108 via a connection system 116 such as a local area network (LAN), wide area network (WAN), the Internet and others. The server systems 104 communicate with each other via connection system 116, for example, for working collectively to provide data-access service to user consoles 102A-102N (may be referred to as user 102 or client system 102).

Server systems 104 may be computing devices (or nodes) configured to execute applications 106A-106N (maybe referred to as application 106 or applications 106) over a variety of operating systems, including the UNIX® and Microsoft Windows® operating systems (without derogation of any third party trademark rights). Applications 106 may utilize storage services of the storage system 108 to access, store, and manage data in a set of storage devices 110 that are described below in detail.

Server systems 104 generally utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

In one aspect, server 104A may also execute a virtual machine environment 114. In the virtual machine environment 114 a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual execution environment 114 executes a plurality of VMs 126A-126N that execute a plurality of guest OS 128A-128N (may also be referred to as guest OS 128) to share hardware resources 134. As described above, hardware resources 134 may include CPU, memory, I/O devices, storage or any other hardware resource.

A virtual machine monitor (VMM) 124, for example, a processor executed hypervisor layer provided by VMWare Inc., Hyper-V layer provided by Microsoft Corporation (without derogation of any third party trademark rights) or any other layer type, presents and manages the plurality of guest OS 128A-128N. VMM 124 may include or interface with a virtualization layer (VIL) 132 that provides one or more virtualized hardware resource 134 to each guest OS. For example, VIL 132 presents physical storage at storage devices 110 as virtual storage (for example, as a virtual hard drive (VHD)) to VMs 126A-126N. The VMs use the VHDs to store information at storage devices 110.

In one aspect, VMM 124 is executed by server system 104A with VMs 126A-126N. In another aspect, VMM 124 may be executed by an independent stand-alone computing system, often referred to as a hypervisor server or VMM server and VMs 126A-126N are presented via another computing system. It is noteworthy that various vendors provide virtualization environments, for example, VMware Corporation, Microsoft Corporation (without derogation of any third party trademark rights) and others. The generic virtualization environment described above with respect to FIG. 1A may be customized depending on the virtual environment provider.

System 100 may also include a management system 118 executing a management application 120 for managing and configuring various elements of system 100. Management application 120 may include one or more applications for monitoring system 100 resources, managing the various resources and providing storage related services e.g., backup, restore, cloning and other services. The various adaptive aspects of the present disclosure are not limited to any specific functionality of the management application 120.

In one aspect, storage system 108 is a shared storage system having access to a set of mass storage devices 110 (may be referred to as storage devices 110) within a storage subsystem 112. As an example, storage devices 110 may be a part of a storage array within the storage sub-system 112. Storage devices 110 are used by the storage system 108 for storing information. The storage devices 110 may include writable storage device media such as magnetic disks, video tape, optical, DVD, magnetic tape, non-volatile memory devices for example, self-encrypting drives, flash memory devices and any other similar media adapted to store information. The storage devices 110 may be organized as one or more groups of Redundant Array of Independent (or Inexpensive) Disks (RAID). The various aspects disclosed herein are not limited to any particular storage device or storage device configuration.

In one aspect, to facilitate access to storage devices 110, a storage operating system of storage system 108 "virtualizes" the storage space provided by storage devices 110. The storage system 108 can present or export data stored at storage devices 110 to server systems 104 and VMM 124 as a storage volume or one or more qtree sub-volume units including LUNs. Each storage volume (or LUN) may be configured to store data files (or data containers or data objects), scripts, word processing documents, executable programs, and any other type of structured or unstructured data. From the perspective of the VMS/server systems, each volume can appear to be a single disk drive. However, each volume can represent the storage space in one disk, an aggregate of some or all of the storage space in multiple disks, a RAID group, or any other suitable set of storage space.

It is noteworthy that the term "disk" as used herein is intended to mean any storage device/space and not to limit the adaptive aspects to any particular type of storage device, for example, hard disks.

The storage system 108 may be used to store and manage information at storage devices 110 based on a request generated by server system 104, management system 118, user 102 and/or a VM. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 (or VMs 126A-126N) transmits one or more input/output (I/O) commands, such as an NFS or CIFS request, over connection system 116 to the storage system 108. Storage system 108 receives the request, issues one or more I/O commands to storage devices 110 to read or write the data on behalf of the server system 104, and issues an NFS or CIFS response containing the requested data over the connection system 116 to the respective server system 104.

In one aspect, system 100 may also include a cloud provider 130 for enabling cloud computing. The cloud provider 130 maybe a standalone computing device/VM executing an application for providing cloud based computing services. Cloud computing means computing capability that provides an abstraction between a computing resource and its underlying technical architecture (e.g., servers, storage, networks), enabling convenient, on-demand network access to a shared pool of configurable computing resources that can be rapidly provisioned and released with minimal management effort or service provider interaction.

In the cloud computing environment, storage space at storage system 108 is made available to clients by a cloud provider 130 for storing information. Typically, the cloud provider licenses storage space to clients for storing and accessing data. The storage space maybe used by one or more applications. The operating policies of the applications are controlled externally from the applications, as described below in detail.

Figure 1B:
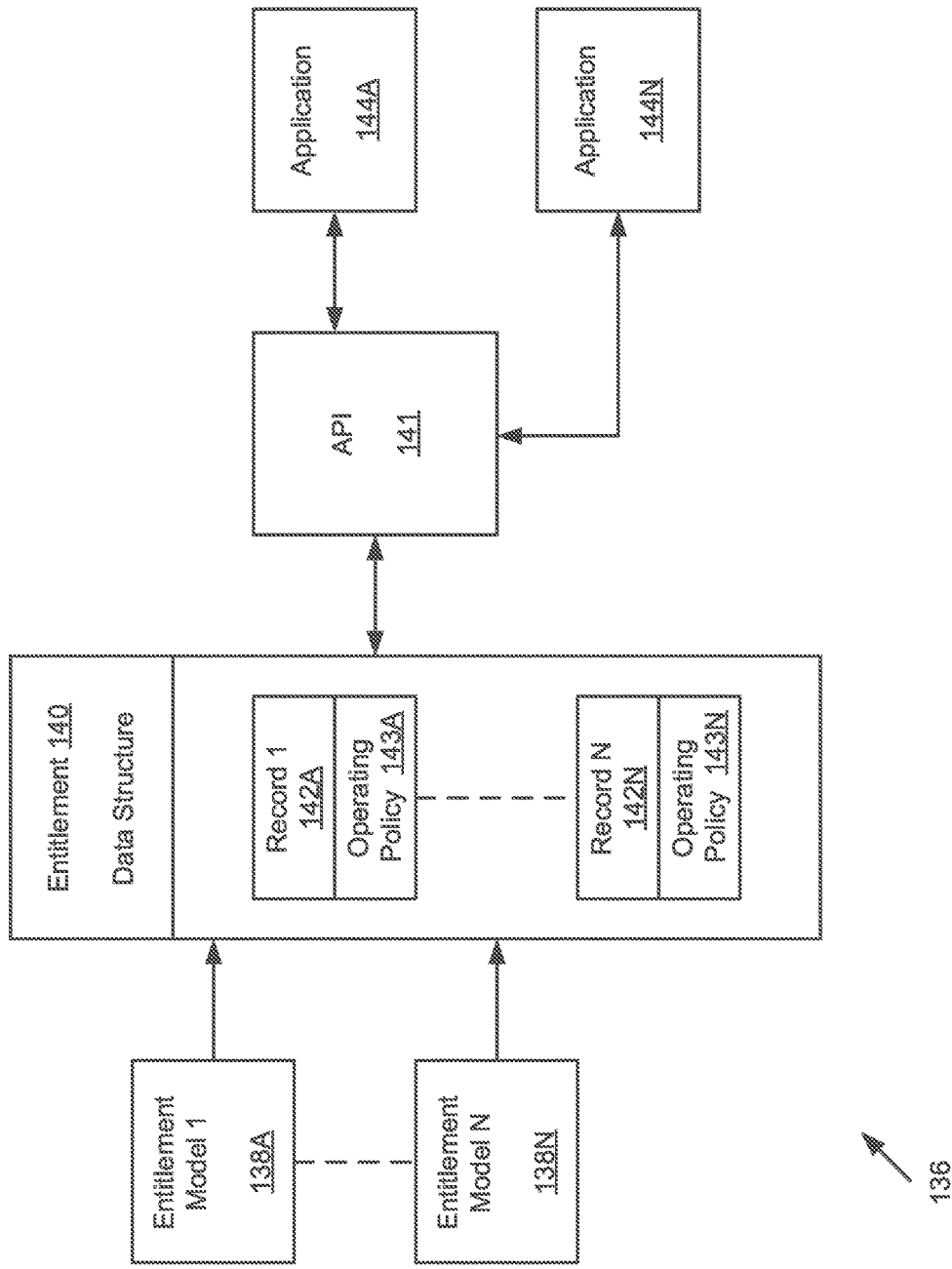
FIG. 1B shows an example for generating an entitlement data structure, according to one aspect of the present disclosure.

Architecture 136:

FIG. 1B shows an example of an architecture 136 for implementing a distributed client operation management (DiCOM) technology for controlling software execution using entitlement parameters. The entitlement parameters are defined by operating policies that are stored within a record outside the code base of the application, as described below in detail. Architecture 136 may be implemented in a service oriented architecture (SOA) to develop and deploy software applications.

In one aspect, entitlement models 138A-138N (may be referred to as entitlement model or entitlement models 138) are defined for applications 144A-144N (similar to applications 106 and management application 120 described above). The entitlement models are based on a licensing/monetization strategy for applications 144A-144N. For example, an entitlement model maybe based on a term of a license, e.g., 12 months. Another entitlement model maybe based on usage, for example, a storage provider may license a certain storage capacity associated with an application. In that instance, the entitlement model maybe defined by "capacity". Yet another example of an entitlement model maybe based on performance, for example, a storage provider may guarantee a certain service level objective for storing and accessing data at storage system 108. Another entitlement model maybe based on the life of a component, for example, a storage server. It is noteworthy that the adaptive aspects of the present disclosure are not limited to any specific license term or entitlement model. The term entitlement as used herein defines what a customer of an application receives after licensing/purchasing the application.

For different entitlement models, an entitlement record (shown as records 142A-142N and maybe referred to as record 142 or records 142) is created and stored at a data structure 140. The data structure 140 maybe stored within an enterprise system (for example, Oracle, SAP or any other system (without derogation of any third party trademark rights)).

Each record 142 is associated with an operating policy 143A-143N (may be referred to as operating policy or operating policies 143). Each record and operating policy is uniquely identified and the policy identifier maybe mapped to a serial number of an application. The operating policies 143 are based on compliance with licensing terms for applications 144A-144N for an entitlement model. The operating policies may be defined and associated with specific customers, specific applications and specific operating environments. It is noteworthy that more than one operating policy may be associated with the same entitlement model.

In one aspect, the operating policies 143 are delivered to the applications 144A-144N in a technology agnostic manner. For example, operating policies 142 are delivered to the applications using an application programming interface (API) 141. As an example, API 141 maybe a REST API. REST means "Representational State Transfer", which is a scalable API system used for building web services. REST based applications may use HTTP (hyper-text transfer protocol) or other communication protocols for communication. The various aspects disclosed herein are not limited to any specific API format.

The operating policies maybe enabled by the applications using a software development kit (SDK) provided for the applications 144. To deploy an application, a user may provide a unique identifier that is related to an operating policy. The operating policy associated with the unique identifier is retrieved from data structure 140 and provided to the application for enforcement.

Figure 1C:
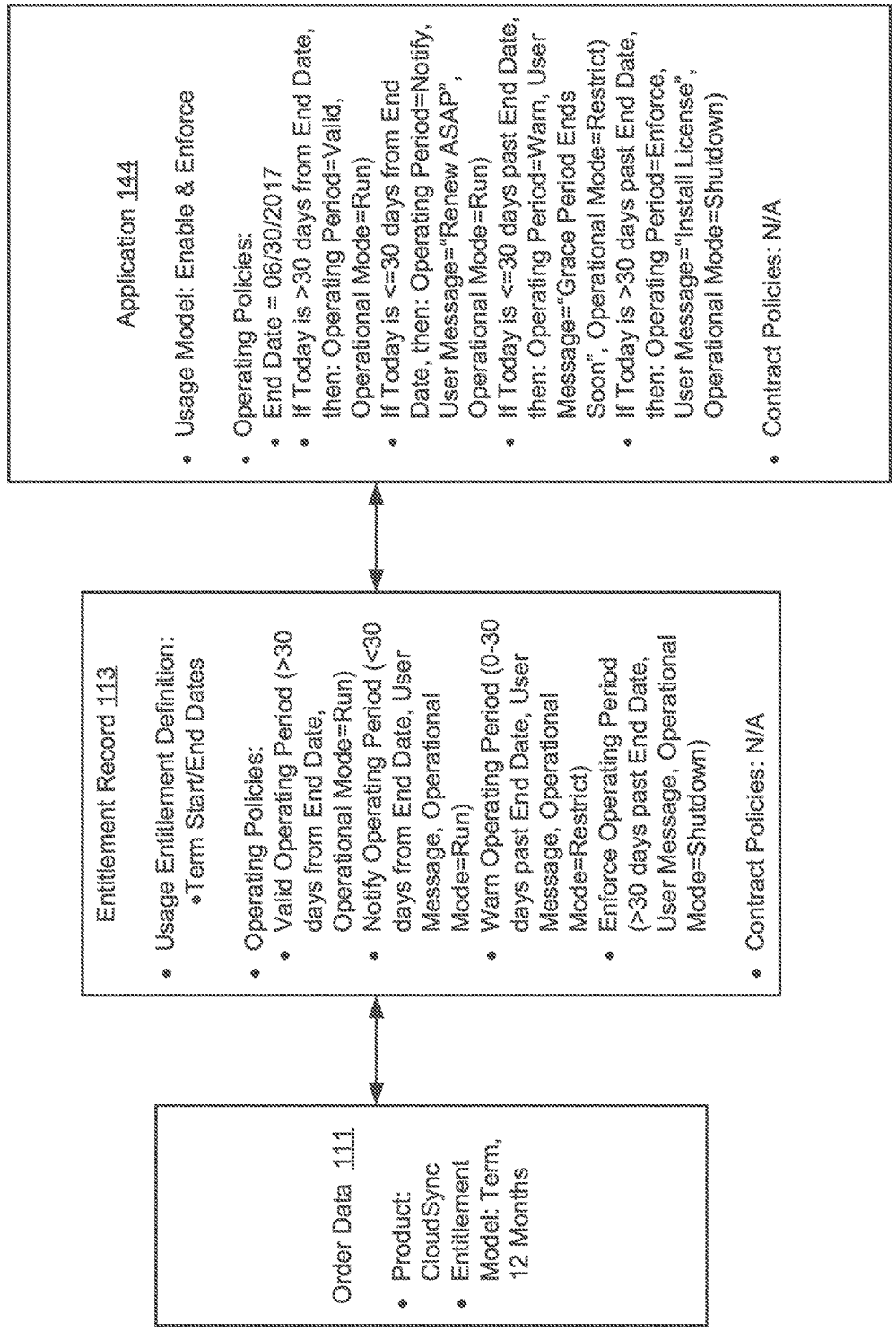
FIG. 1C shows an example of providing an operating policy to a processor executable application, according to one aspect of the present disclosure.

FIG. 1C shows an example of using architecture 136, according to one aspect of the present disclosure. A customer order 111 for an application is received. As an example, the customer order is for an application called "CloudSync". The entitlement model for the product is defined as "Term", where the term is defined as 12 months. The entitlement record 113 includes various operating policies for the entitlement model. For example, the operating policies establish a valid operating period, a notify operating period, a "warm operating period" and an "enforce operating period" after which the application is shutdown. The operating policies are provided to the application 144 with specific terms. For example, the end data is defined as Jun. 17, 2030 and if the end data is greater than 30 days, then application 144 prompts the user to "install license". The application 144 can use the operating parameters to control software execution, without having to hard code the operating parameters to meet the entitlement model. It is noteworthy that the example of FIG. 1C is not intended to limit the disclosure to any specific operating policy or entitlement model.

Thus, the innovative DiCOM technology described herein enables an application provider/developer to use entitlement models and operating policies outside the application code to control the behavior of the application.

Figure 1D:
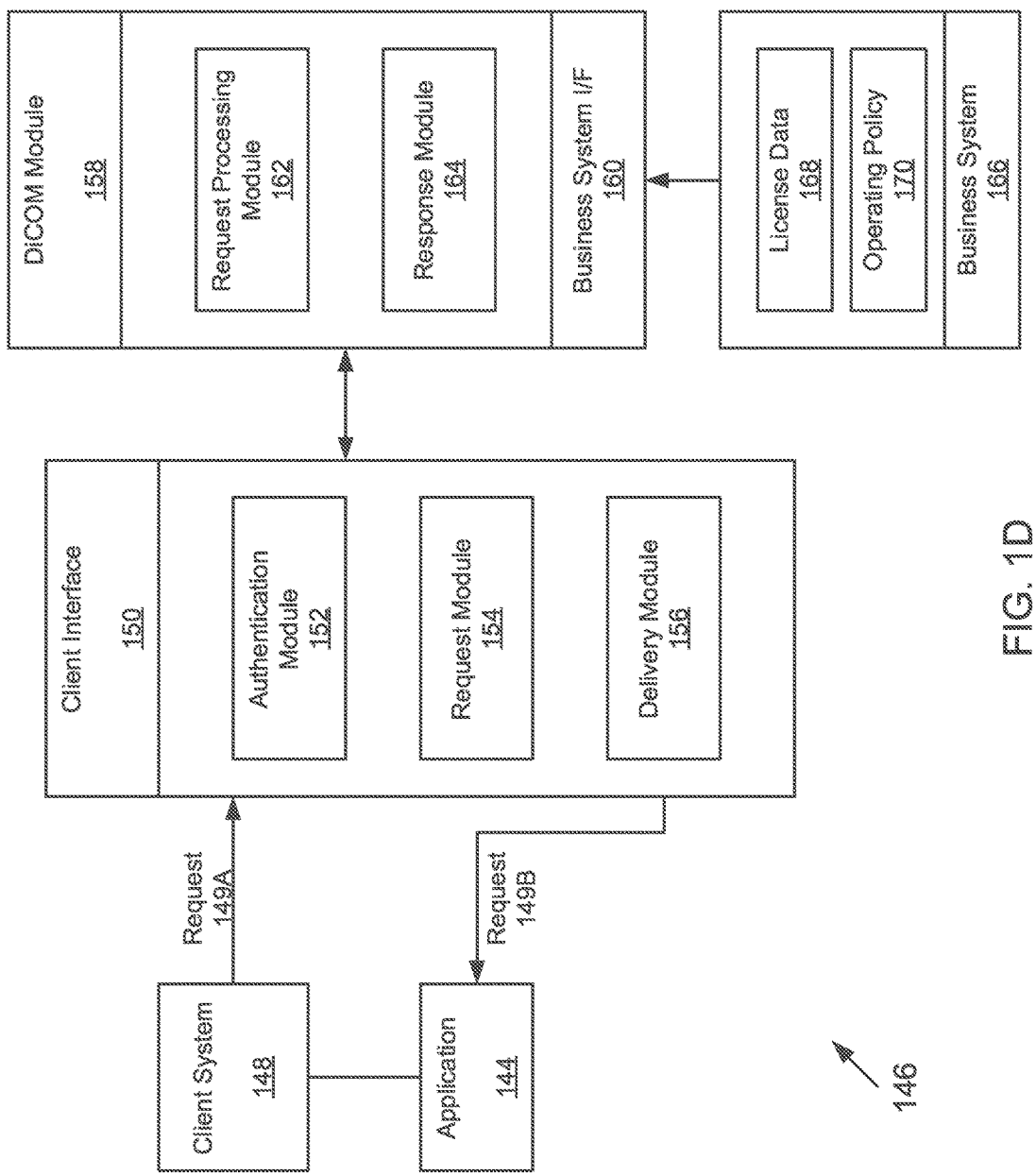
FIG. 1D shows an example of an architecture for managing application execution using externally stored operating policies, according to one aspect of the present disclosure.

DiCOM Architecture 146:

FIG. 1D shows another example 146 of the innovative DiCOM technology for executing applications using operating polices stored at a data structure 140 that is external to the applications, according to one aspect of the present disclosure. As shown in FIG. 1D, a client system 148 executes or accesses a processor executable application 144 for performing a function. The client system 148 sends a request 149A for license/policy data using authorized credentials, for example, a username and password. The license data 168 and operational policy 170 maybe stored by the application provider using a business system 166 (for example, an enterprise software system) that is separate from the application 144. In one aspect, license data 168 and operating policy 170 are part of an entitlement record 142 described above with respect to FIG. 1B.

A client interface module 150 authenticates the request 149A using an authentication module 152. The request is then pre-processed by a request processing module 154 and provided to the DiCOM module 158.

The DiCOM module 158 includes a business system interface 160 that interfaces with the business system 166 to retrieve the license and operating policy data based on request 149A. A request processing module 162 parses the user request to obtain an identifier associated with the license and operating policy for application 144.

Using the identifier, the DiCOM module 158 retrieves the license and operating policy data from the business system 166. The license and policy data maybe in a format that is used by the business system 166. A response for client system is then prepared by the response processing module 164 by transforming the raw license and policy data to a format defined by request 149A. In one aspect, the response module 164 transforms the raw license and policy data into a JSON (Java Script Notation) object that may be encrypted. It is noteworthy that the technology disclosed herein is not limited to any specific format for the response 149B.

The response is provided to the client interface module 150 and delivered as 149B to the client by the delivery module 156. The delivery module 156 may process/format the response from the DiCOM module 158 before providing it to the client 148. The response 149B enables the client system 148 to execute application 144 using the operating policy associated with the application based on license terms for the client system as well the operating environment of the client system. The license data is based on an entitlement model for the product that can vary from one application to another.

Figure 1E:
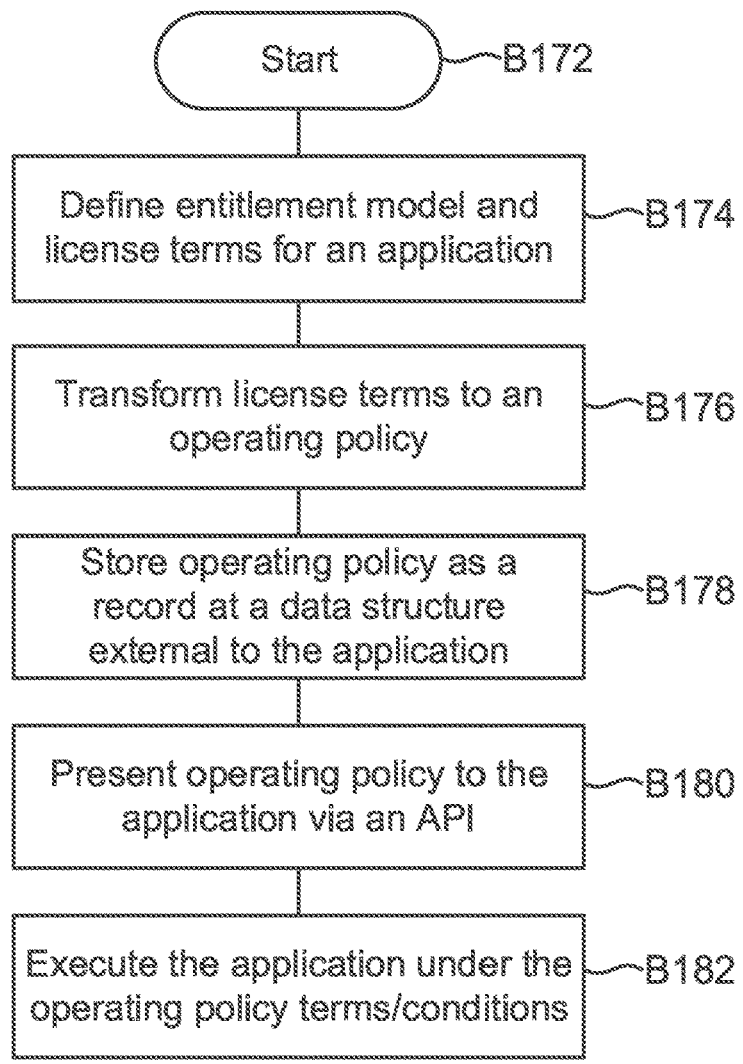
FIG. 1E shows a process flow for generating an operating policy record, according to one aspect of the present disclosure.

Process Flows:

FIG. 1E shows a process 170 for implementing the innovative DiCOM technology of the present disclosure. The process begins in block B172, when an application 144 has been developed or is in the process of being developed. In block B174, an entitlement model (e.g. 138, FIG. 1B) for the application 144 is defined. The license parameters associated with the entitlement parameters are also defined. The entitlement parameters maybe defined using a unique identifier for the application.

In block B176, the license terms for the entitlement model are transformed into an operating policy (e.g. 143, FIG. 1B) for the application. Based on the operating policy, an entitlement record (e.g. 142, FIG. 1B) is created in block B178. The operating policy is stored at data structure 140 in block B178 and uniquely identified. As explained above, data structure 140 is maintained external to the application 144 i.e. the data structure 140 is not a part of an application code base.

In block B180, the operating policy is provided to the application 144 using an API, for example, a REST API. The operating policy may be provided in response to a client request as described above with respect to FIG. 1D.

In block B182, the application 142 is executed using the operating policy.

Figure 1F:
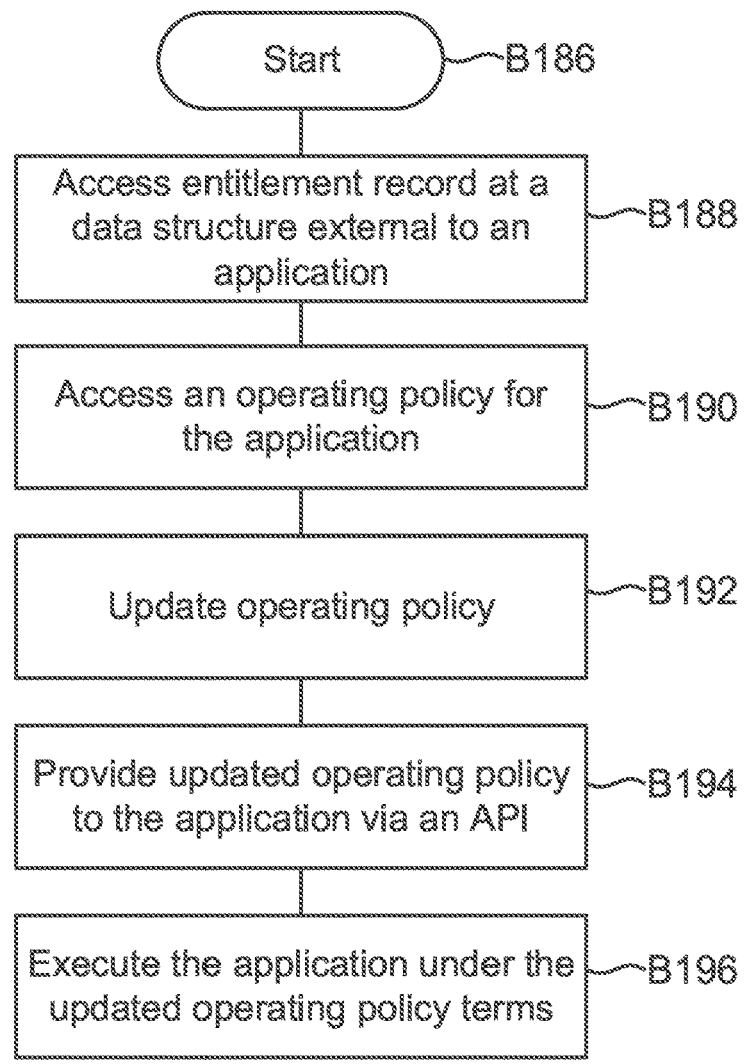
FIG. 1F shows a process flow for updating an operating policy, according to one aspect of the present disclosure.

FIG. 1F shows a process 184 for updating an entitlement record/operating policy at data structure 140, according to one aspect of the present disclosure. The process starts in block B186, when the data structure 140 has been populated with operating policies based on one or more entitlement models, licensing terms and features. In one aspect, the data structure 140 maybe updated by an authorized user using a computing device. A specific entitlement record is accessed using a unique identifier for the record in block B188. An operating policy is accessed in block B190. The operating policy is updated in block B192. The updated operating policy is then provided to the application in block B194. Thereafter, in block B196, the application is executed using the updated operating policy.

In one aspect, the innovative DiCOM technology described herein translates licensing and operating policies into application behavior without having to individually update application code. The licensing and policy data is integrated efficiently with the application using APIs. An operating policy for an application is defined including a term, capacity, utility and other application performance parameters. The operating policy is applied to the application using a plug-n-play process. The operating policy is editable and hence provides flexibility, scalability and can support different user environments. The technology disclosed herein enables efficient product development, customized user experience and control over compliant and non-compliant application use.

In one aspect, an application developer develops computer executable code for an application. The application can be made available under different operating policies that are defined by different license terms. The same application code is executed using different operating policies that are accessible to the application, without having to update the application code or maintain different application code versions. This improves overall computing technology by efficiently controlling application execution.

In one aspect, methods and systems for executing an application by a computing device are provided. One method includes generating an operating policy for a processor executable application based on a licensing term; associating an identifier for storing the operating policy in a data structure external to the application; providing the operating policy to the application using an application programming interface (API) for controlling execution of the application; and executing the application using the operating policy.

Figure 2A:
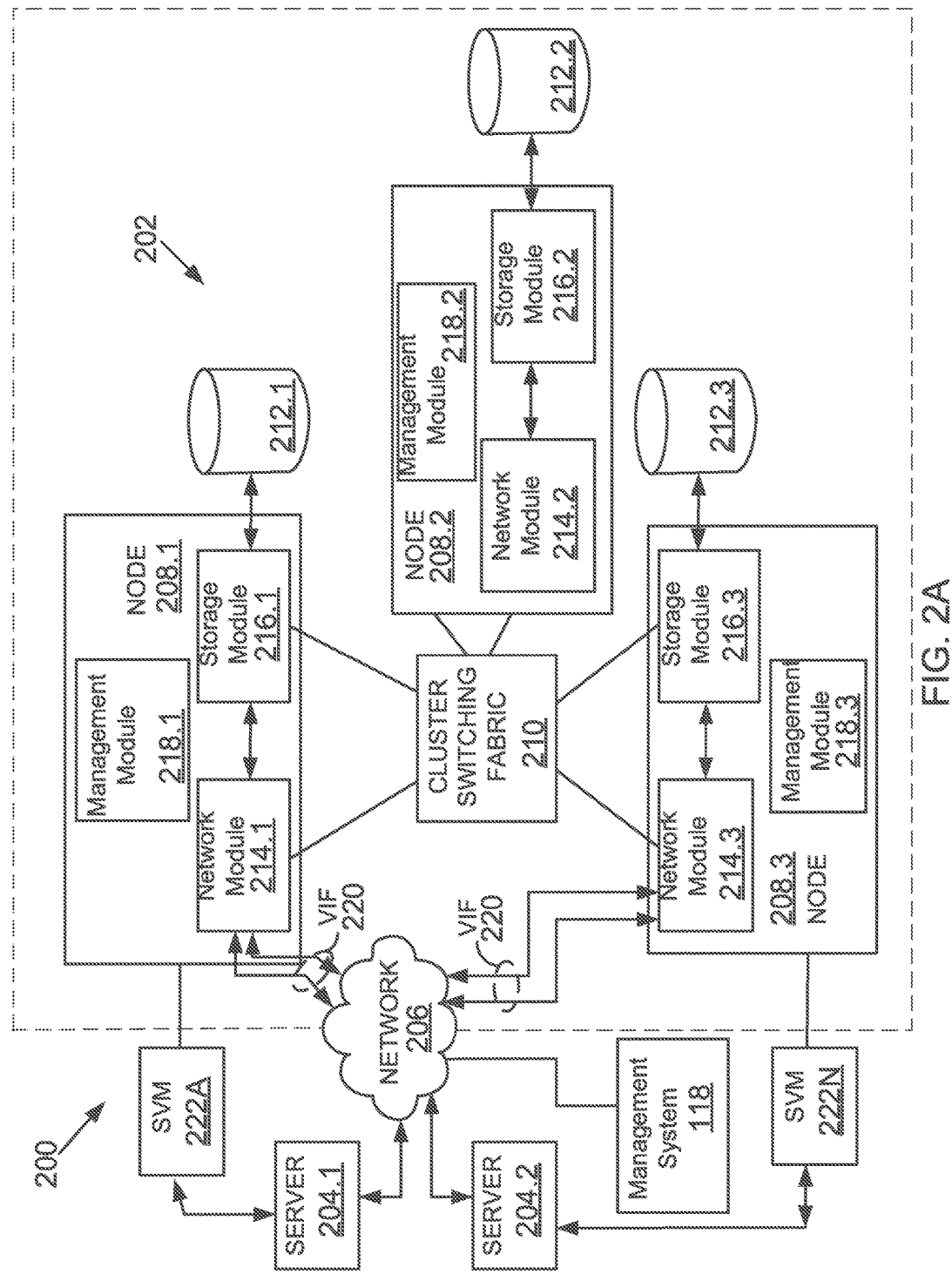
FIG. 2A shows an example of a clustered storage system, according to one aspect of the present disclosure.

Clustered Storage System:

FIG. 2A depicts an illustrative aspect of a storage environment 200 that is accessed by one or more applications and managed by management system 118. The operating policies for different applications is defined at data structure 140, described above. It is noteworthy that the storage environment 200 is only shown as an example and is not intended to limit the scope of the present disclosure.

The storage environment 200 includes a plurality of server systems 204.1-204.2 that execute one or more applications (similar to server systems 104), a clustered storage system 202 and at least one computer network 206 communicably connecting the server systems 204.1-204.2 and the clustered storage system 202.

The clustered storage system 202 includes a plurality of nodes 208.1-208.3, a cluster switching fabric 210, and a plurality of mass storage devices 212.1-212.3 (similar to 110, FIG. 1A). Each of the plurality of nodes 208.1-208.3 is configured to include a network module, a storage module, and a management module, each of which can be implemented as a separate processor executable or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enables the respective nodes 208.1-208.3 to connect to one or more of the client systems 204.1-204.2 over the computer network 206, while the storage modules 216.1-216.3 connect to one or more of the storage devices 212.1-212.3.

The management modules 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network modules 214.1, 214.3 for clarity of illustration.

The clustered storage system 202 can be organized into any suitable number of virtual servers (VServer or storage virtual machines (SVM)) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a SVM is an instance of an application service provided to a client system. The nodes 208.1-208.3 are interconnected by the switching fabric 210, which, for example, may be embodied as a Gigabit Ethernet switch or any other switch type.

Although FIG. 2A depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

The server systems 204.1-204.2 of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address. The server request typically includes a file handle for a data file stored in a specified volume on at storage 212.1-212.3.

Figure 2B:
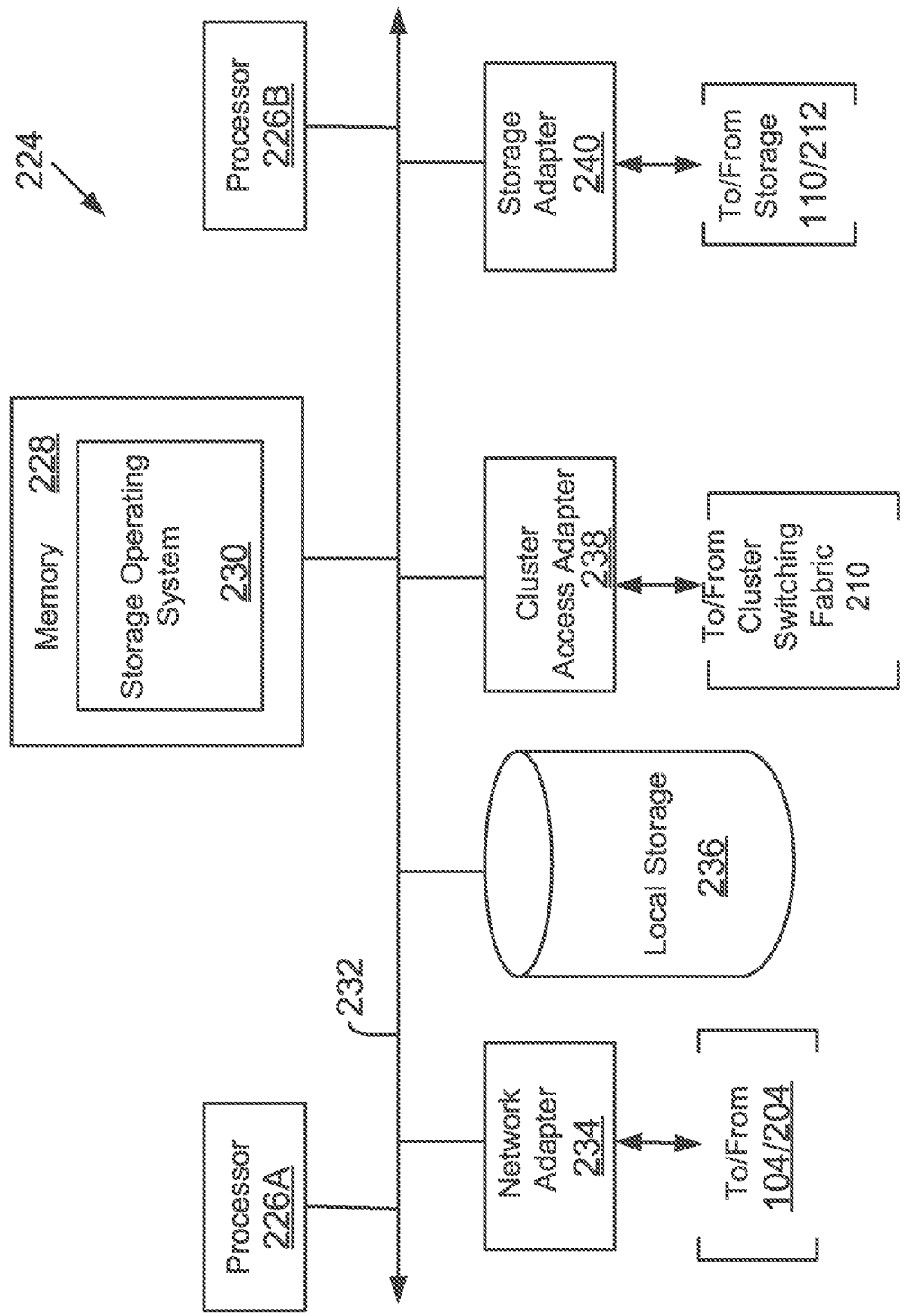
FIG. 2B shows an example of a storage system node, used according to one aspect of the present disclosure.

Storage System Node:

FIG. 2B is a block diagram of a computing system 224, according to one aspect. System 224 may be used by a stand-alone storage system 108 and/or a storage system node operating within a cluster based storage system described above with respect to FIG. 2A.

System 224 may include a plurality of processors 226A and 226B, a memory 228, a network adapter 234, a cluster access adapter 238 (used for a cluster environment), a storage adapter 240 and local storage 236 interconnected by a system bus 232. The local storage 236 comprises one or more storage devices, such as disks, utilized by the processors to locally store configuration and other information, including performance data that is provided to the management system 118.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 that preferably implements a high-level module, such as a file system, to logically organize information as a hierarchical structure of named directories, files and special types of files called virtual disks (hereinafter generally "blocks") on storage devices 110/212. However, it will be apparent to those of ordinary skill in the art that the system 224 may alternatively comprise a single or more than two processor systems. Illustratively, one processor 226 executes the functions of a network module on a node, while the other processor 226B executes the functions of a storage module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein.

The storage operating system 230, portions of which is typically resident in memory and executed by the processing elements, functionally organizes the system 224 by, inter alia, invoking storage operations in support of the storage service provided by storage system 108. An example of operating system 230 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems over point-to-point links, wide area networks, virtual private networks implemented over a public network (Internet) or a shared local area network. The network adapter 234 thus may comprise the mechanical, electrical and signaling circuitry needed to connect storage system 108 to the network. Illustratively, the computer network may be embodied as an Ethernet network or a FC network.

The storage adapter 240 cooperates with the storage operating system 230 executing on the system 224 to access information requested by the server systems 104 and management system 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 240 comprises a plurality of ports having input/output (I/O) interface circuitry that couples to the disks over an I/O interconnect arrangement, such as a conventional high-performance, FC link topology.

In another aspect, instead of using a separate network and storage adapter, a converged adapter is used to process both network and storage traffic.

Figure 3:
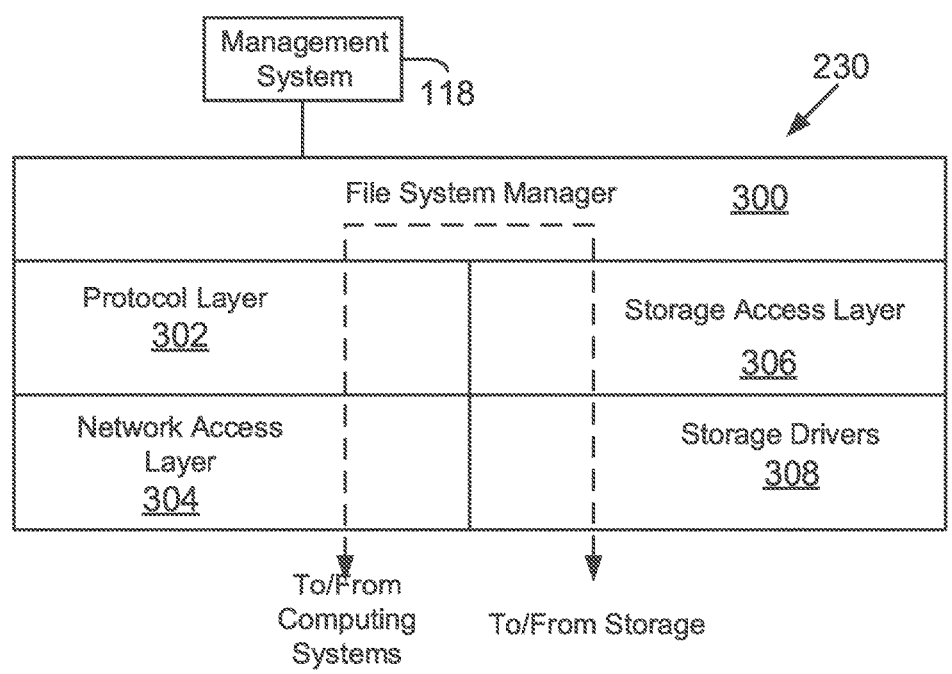
FIG. 3 shows an example of a storage operating system, used according to one aspect of the present disclosure.

Operating System:

FIG. 3 illustrates a generic example of operating system 230 executed by storage system 108, according to one aspect of the present disclosure. Storage operating system 230 interfaces with the management system 118 executing one or more management applications 120 and host systems 104.

As an example, operating system 230 may include several modules, or "layers". These layers include a file system manager 300 that keeps track of a directory structure (hierarchy) of the data stored in storage devices and manages read/write operations, i.e. executes read/write operations on disks in response to server system 104 requests.

Operating system 230 may also include a protocol layer 302 and an associated network access layer 304, to allow system 200 to communicate over a network with other systems, such as server system 104 and management system 118. Protocol layer 302 may implement one or more of various higher-level network protocols, such as NFS, CIFS, Hypertext Transfer Protocol (HTTP), TCP/IP and others, as described below.

Network access layer 304 may include one or more drivers, which implement one or more lower-level protocols to communicate over the network, such as Ethernet. Interactions between server systems 104 and mass storage devices 110/212 are illustrated schematically as a path, which illustrates the flow of data through operating system 230.

The operating system 230 may also include a storage access layer 306 and an associated storage driver layer 308 to communicate with a storage device. The storage access layer 306 may implement a higher-level disk storage protocol, such as RAID (redundant array of inexpensive disks), while the storage driver layer 308 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 108.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
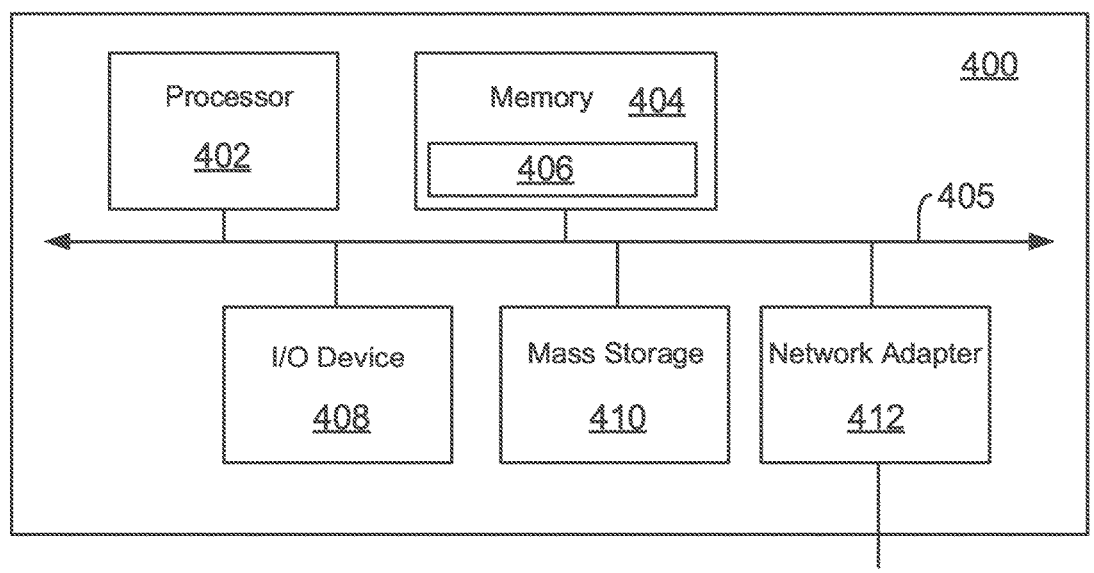
FIG. 4 shows an example of a processing system, used according to one aspect of the present disclosure.

Processing System:

FIG. 4 is a high-level block diagram showing an example of the architecture of a processing system, at a high level, in which executable instructions as described above can be implemented. The processing system 400 can represent modules of management system 118, user console 102, server systems 104, client system 148, client interface 150, DiCOM module 158, business system 166, and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include instructions for executing the process blocks of FIGS. 1D, 1E and 1F and store data structure 140.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Thus, a method and apparatus for controlling execution of software applications have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising;
   transforming an entitlement model to an operating policy for a processor executable application in a networked storage system,
   wherein the entitlement model is based on an entitlement parameter selected from a licensing term for executing the application, a storage capacity used by the application to store and retrieve data at the networked storage system, a service level for storing and accessing data and an end of life duration of a component used by the networked storage system;
   wherein the operating policy defines operating parameters for executing the application to comply with the entitlement model;
   associating an identifier for storing the operating policy with an entitlement record indicating the entitlement model for the application in a data structure external to the application;
   wherein the entitlement record and the operating policy are updated based on a change in the entitlement parameter;
   mapping the identifier for the operating policy to an application identifier;
   providing the operating policy with the operating parameters to the application using an application programming interface (API) for controlling execution of the application; and
   executing the application using the operating policy parameters.

2. The method of claim 1, wherein the entitlement model for the application is associated with a plurality of operating policies.

3. The method of claim 1, wherein the API is a REST API.

4. The method of claim 1, wherein the operating policy is stored by a processor executable enterprise system separate from the application.

5. The method of claim 1, wherein the operating policy is provided to the application upon receiving a request for the operating policy with the identifier and the application identifier.

6. The method of claim 1, wherein the application is a management application used in the networked storage system.

7. The method of claim 1, wherein the application is an application executed by a host system accessing the networked storage system.

8. A non-transitory, machine-readable storage medium having stored thereon instructions for performing a method, comprising machine executable code which when executed by at least one machine, causes the machine to:
   transform an entitlement model to an operating policy for a processor executable application in a networked storage system,
   wherein the entitlement model is based on an entitlement parameter selected from a licensing term for executing the application, a storage capacity used by the application to store and retrieve data at the networked storage system, a service level for storing and accessing data and an end of life duration of a component used by the networked storage system;
   wherein the operating policy defines operating parameters for executing the application to comply with the entitlement model;
   associate an identifier for storing the operating policy with an entitlement record indicating the entitlement model for the application in a data structure external to the application;
   wherein the entitlement record and the operating policy are updated based on a change in the entitlement parameter;
   map the identifier for the operating policy to an application identifier;
   provide the operating policy with the operating parameters to the application using an application programming interface (API) for controlling execution of the application; and
   execute the application using the operating policy parameters.

9. The non-transitory storage medium of claim 8, wherein the entitlement model for the application is associated with a plurality of operating policies.

10. The non-transitory storage medium of claim 8, wherein the API is a REST API.

11. The non-transitory storage medium of claim 8, wherein the operating policy is stored by a processor executable enterprise system separate from the application.

12. The non-transitory storage medium of claim 8, wherein the operating policy is provided to the application upon receiving a request for the operating policy with the identifier and the application identifier.

13. The non-transitory storage medium of claim 8, wherein the application is a management application used in the networked storage system.

14. The non-transitory storage medium of claim 8, wherein the application is an application executed by a host system accessing the networked storage system.

15. A system, comprising:
   a memory containing machine readable medium comprising machine executable code having stored thereon instructions; and a processor module coupled to the memory, the processor module configured to execute the machine executable code to:
   transform an entitlement model to an operating policy for an application in a networked storage system,
   wherein the entitlement model is based on an entitlement parameter selected from a licensing term for executing the application, a storage capacity used by the application to store and retrieve data at the networked storage system, a service level for storing and accessing data and an end of life duration of a component used by the networked storage system;

wherein the operating policy defines operating parameters for executing the application to comply with the entitlement model;

associate an identifier for storing the operating policy with an entitlement record indicating the entitlement model for the application in a data structure external to the application;

wherein the entitlement record and the operating policy are updated based on a change in the entitlement parameter;

map the identifier for the operating policy to an application identifier;

provide the operating policy with the operating parameters to the application using an application programming interface (API) for controlling execution of the application; and execute the application using the operating policy parameters.

16. The system of claim 15, wherein the entitlement model for the application is associated with a plurality of operating policies.

17. The system of claim 15, wherein the API is a REST API.

18. The system of claim 15, wherein the operating policy is stored by an enterprise system separate from the application.

19. The system of claim 15, wherein the operating policy is provided to the application upon receiving a request for the operating policy with the identifier and the application identifier.

20. The system of claim 15, wherein the application is a management application used in the networked storage system.

* * * * *